US008756186B2

(12) United States Patent
Bolivar et al.

(10) Patent No.: US 8,756,186 B2
(45) Date of Patent: *Jun. 17, 2014

(54) SYSTEMS AND METHODS FOR MAKING CONTEXTUAL RECOMMENDATIONS

(71) Applicant: eBay Inc., San Jose, CA (US)

(72) Inventors: Alvaro Bolivar, San Francisco, CA (US); Xiaoyuan Wu, Shanghai (CN); Jiaqian Zheng, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,092

(22) Filed: Feb. 25, 2013

(65) Prior Publication Data

US 2013/0179385 A1 Jul. 11, 2013

Related U.S. Application Data

(63) Continuation of application No. 12/603,348, filed on Oct. 21, 2009, now Pat. No. 8,386,406.

(60) Provisional application No. 61/224,026, filed on Jul. 8, 2009.

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| 5,377,095 | A  | 12/1994 | Maeda et al. |
| 6,272,507 | B1 | 8/2001  | Pirolli et al. |
| 6,489,968 | B1 | 12/2002 | Ortega et al. |
| 7,401,025 | B1 | 7/2008  | Lokitz |
| 7,487,146 | B2 | 2/2009  | Friedman |
| 7,526,478 | B2 | 4/2009  | Friedman |
| 7,584,200 | B2 | 9/2009  | Pfeifer |
| 7,603,366 | B1 | 10/2009 | Gritsay et al. |
| 7,624,117 | B2 | 11/2009 | Fuerst et al. |
| 7,660,786 | B2 | 2/2010  | Wang et al. |
| 7,797,197 | B2 | 9/2010  | Kumar et al. |
| 7,937,353 | B2 | 5/2011  | Bernoth et al. |
| 7,953,647 | B2 * | 5/2011 | Bolivar et al. ............. 705/26.35 |

(Continued)

OTHER PUBLICATIONS

"U.S. Appl. No. 12/498,209, Response filed Feb. 27, 2012 to Non Final Office Action mailed Nov. 25, 2011", 17 pgs.

(Continued)

*Primary Examiner* — Michael B Holmes
(74) *Attorney, Agent, or Firm* — Schwegman, Lundberg & Woessner, P.A.

(57) ABSTRACT

A method and a system for making contextual recommendations to users on a network-based system. For example, a first and second related category are selected and a relationship score is calculated representing an aspect of the relationship between the first and second related categories. A relationship type is selected to represent the relationship between the first and second categories using the relationship score. The relationship type is one of either a complement or a substitute. A complement relationship indicates a complementary relationship between the first and second related categories. While a substitute relationship indicates a substitutionary relationship between the first and second categories. The relationship type is stored associated with the first and second related categories. Using the selected relationship type, a recommendation is provided to a user on the network-based system.

22 Claims, 11 Drawing Sheets

(56) References Cited

U.S. PATENT DOCUMENTS

| | | | |
|---|---|---|---|
| 8,001,105 B2 * | 8/2011 | Bolivar et al. | 707/709 |
| 8,050,998 B2 * | 11/2011 | Bolivar et al. | 705/37 |
| 8,051,040 B2 * | 11/2011 | Johnson et al. | 707/627 |
| 8,090,754 B2 | 1/2012 | Schmidt et al. | |
| 8,117,060 B2 * | 2/2012 | Hu et al. | 705/7.31 |
| 8,145,662 B2 * | 3/2012 | Chen et al. | 707/767 |
| 8,195,683 B2 * | 6/2012 | Bolivar | 707/765 |
| 8,200,662 B2 * | 6/2012 | Reitter et al. | 707/722 |
| 8,209,320 B2 * | 6/2012 | Reitter et al. | 707/709 |
| 8,239,275 B1 | 8/2012 | Lyren et al. | |
| 8,332,383 B2 * | 12/2012 | Posner et al. | 707/708 |
| 8,384,606 B2 * | 2/2013 | Shoji | 343/745 |
| 8,386,406 B2 | 2/2013 | Bolivar et al. | |
| 8,473,360 B2 * | 6/2013 | Bolivar | 705/26.1 |
| 2002/0082902 A1 | 6/2002 | Ando et al. | |
| 2003/0004781 A1 | 1/2003 | Mallon et al. | |
| 2011/0004509 A1 | 1/2011 | Wu et al. | |
| 2011/0010324 A1 | 1/2011 | Bolivar et al. | |

OTHER PUBLICATIONS

"U.S. Appl. No. 12/498,209, Response filed Aug. 15, 2012 to Final Office Action mailed May 15, 2012", 13 pgs.

"U.S. Appl. No. 12/498,209, Final Office Action mailed May 15, 2012", 24 pgs.

"U.S. Appl. No. 12/498,209, Non Final Office Action mailed Nov. 25, 2011", 21 pgs.

"U.S. Appl. No. 12/498,209, Non Final Office Action mailed Nov. 26, 2012", 24 pgs.

"U.S. Appl. No. 12/603,348, Response filed Oct. 9, 2012 to Non Final Office Action mailed Oct. 1, 2012", 15 pgs.

"U.S. Appl. No. 12/603,348, Non Final Office Action mailed Oct. 1, 2012", 8 pgs.

"U.S. Appl. No. 12/603,348, Notice of Allowance mailed Jul. 9, 2012", 6 pgs.

"U.S. Appl. No. 12/603,348, Notice of Allowance mailed Oct. 23, 2012", 11 pgs.

Dimoka, Angelika, et al., "Undersanding and Mitigating Product Uncertainty in Online Auction Marketplaces", Anderson Graduate School of Management, University of California, Rierside. Industry Studies 2008, (Nov. 2007).

Dimoka, Angelika, et al., "Understanding and Mitigating Product Uncertainty in Online Auction Marketplaces", Industry Studies 2008 Annual Conference May 1-2, (Nov. 2007), 53 pgs.

Saunders, Christopher, "Taking the "Pulse" of the Market with eBay and Terapeak", ecommerce-guide, (Nov. 11, 2004), 4 pgs.

* cited by examiner

SUBSTITUTIONARY RELATIONSHIP

COMPLEMENTARY RELATIONSHIP

SYSTEMS AND METHODS FOR MAKING CONTEXTUAL RECOMMENDATIONS

RELATED APPLICATIONS

This application is a Continuation of U.S. patent application Ser. No. 12/603,348, filed Oct. 21, 2009, which application claims the benefit of U.S. Provisional Patent Application No. 61/224,026, filed on Jul. 8, 2009, which applications are hereby incorporated by reference in their entirety.

TECHNICAL FIELD

This application relates generally to network-based publishing and transaction systems operating over a distributed network, and more specifically to systems and methods for making recommendations based on the context of a user's activity with the network-based system.

BACKGROUND

The explosion of information available over network-based systems, such as the internet can overwhelm a person attempting to locate a desired piece of information or product. For example, over the last decade the categories of products available through a typical network-based commerce system has grown exponentially. This dramatic growth has left users with the problem of sorting and browsing through enormous amounts of data to find information or products relevant to their needs. Recommendation systems have been implemented to attempt to assist users in locating relevant information or products. A successful recommendation system on a network-based commerce system not only saves users time in locating relevant products but also brings extra profits to the commerce system's operators.

Most current recommendation systems use some form of collaborative filtering to produce a single scalar number for each potential relationship. Two different basic types of collaborative filtering are typically employed by recommendation systems, user-based or item-based. User-based collaborative filtering focuses on grouping like user behavior. Item-based recommendation systems focus on grouping similar items.

BRIEF DESCRIPTION OF THE DRAWINGS

Some embodiments are illustrated by way of example and not limitation in the figures of the accompanying drawings in which.

DETAILED DESCRIPTION

Figure 1:
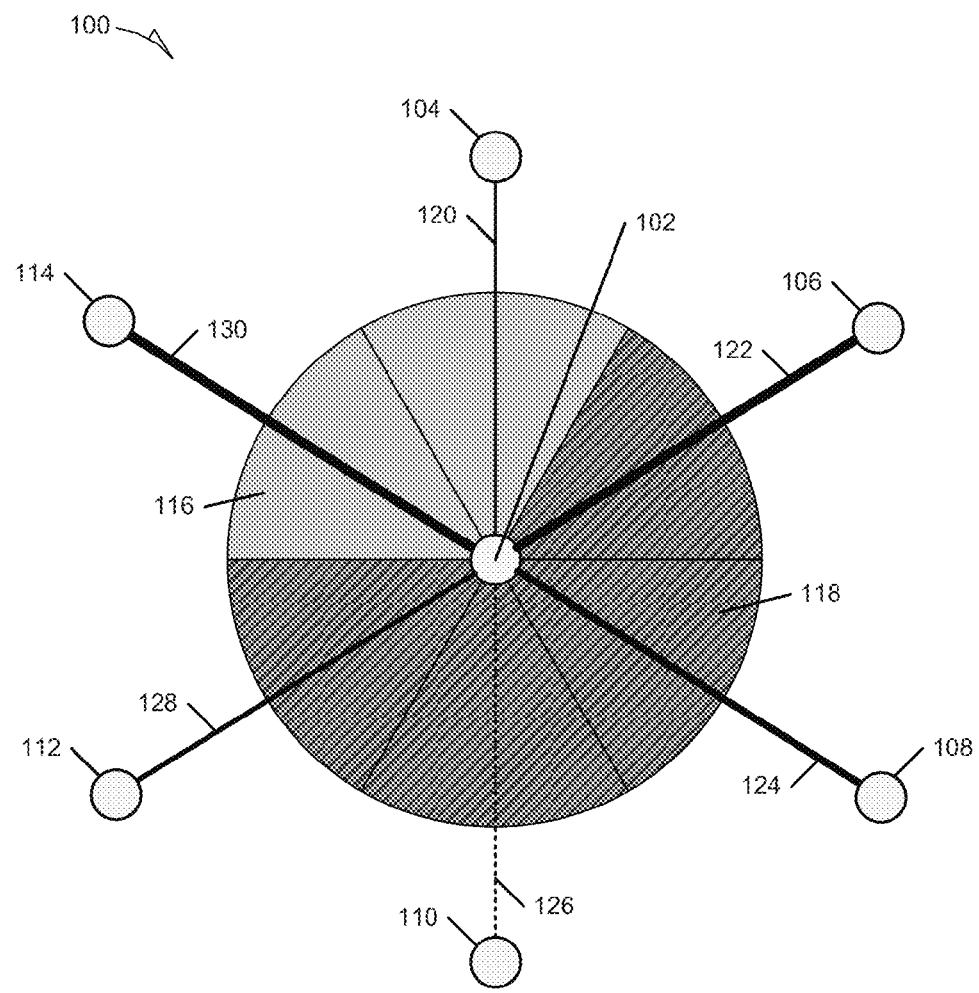
FIG. 1 is a block diagram illustrating various example substitutionary versus complementary type relationships.

Example systems and methods for contextual recommendations are described. The systems and methods for contextual recommendations, in some example embodiments may provide recommendations based on the browsing or searching behavior of a user within a network-based system. In the following description, for purposes of explanation, numerous specific details are set forth in order to provide a thorough understanding of example embodiments. It will be evident, however, to one skilled in the art that the present invention may be practiced without these specific details. It will also be evident, that contextual recommendations are not limited to the examples provided and may include other scenarios not specifically discussed.

In accordance with an example embodiment, the system can provide recommendations that are consistent with a user's location within a purchase lifecycle. One of the potential issues plaguing standard collaborative filtering (CF) recommendation systems is the strong potential for misadvising (or providing unwanted recommendations). The standard CF recommendation system does not track current user activity or make any attempt to determine where in the purchase lifecycle the user is currently located. As a result, CF recommendation systems will often recommend redundant items, overlook accessories, or recommend complementary items too soon (termed an "unpleasant break-in"). The following example misadvising scenarios use the Apple iPod series of MP3 music players (from Apple, Inc. Cupertino, Calif.) by way of example in describing common behavior of CF recommendation systems.

Redundant Items:

A user who just purchased an iPod will likely be recommended another portable media player, such as a iPod Nano. Such redundant suggestions are induced by the nature of the CF recommendation systems. Some CF systems find users with similar taste and use their opinions to generate recommendations. For example, in a group of music fans, members may purchase various types of iPod series products. This common behavior places i-series players quite close to each other in correlation metrics used by CF systems. Additionally, CF recommendation systems also use keywords to group items for recommendation, making it likely that all Apple iPod products will be closely related.

However, most users are unlikely to purchase another portable music player shortly after just buying one. It makes more sense to recommend an accessory or other related item that does not have the same functionality as what was just purchased (i.e., a complementary product recommendation opportunity).

Overlooked Accessories:

Recommendation systems have always been intended to help sell accessories after the purchase of something like an iPod. However, in traditional CF systems that only use purchase histories, expensive accessories (e.g., speakers or noise-canceling headphones) can be overlooked due to the relatively low purchase history correlation. Expensive accessories are often not purchased directly after or in conjunction with an iPod (or any relatively major) purchase. However, these expensive accessories may meet a customer's latent purchase requirements. Unfortunately, CF systems will typically rank items with similar keywords, titles, or descriptions over expensive accessories causing the typical recommendation algorithms to overlook the potentially advantageous recommendations.

Unpleasant Break-Ins:

When a user is in the process of purchasing something like an iPod, the user will often spend considerable time browsing the various options available on a typical e-commerce website. It is very common to do some comparison shopping, read reviews, and search for alternatives before making a purchase decision. During this evaluation period it is unlikely that the user will spend much time looking at accessories, or even be very interested in the accessories available for a particular product. If a recommendation system presents accessories as recommendations at this point the user is likely to ignore the recommendations as out of context, which may diminish the likelihood that the user will act on a future recommendation as well. If the recommendations are too far away from the intended purchase the recommendation can even disrupt the purchase cycle and delay or prevent a potential sale.

The misadvising scenarios described above are caused by the fact that most conventional CF algorithms focus solely on user purchase data. As another data source, user browsing logs (on-site behavior data) can allow recommendation systems to identify different stages in the purchase lifecycle, reducing the potential for misadvising and driving greater profits for an on-line (network-based) retailer.

Using browsing history is not without its technical challenges. The analysis of browsing data cannot draw stabilized conclusions as easily as the analysis of purchase data. Purchase data represents a monetary exchange in which users typically act after relatively careful considerations. In contrast, navigation (browsing) behavior does not require that same amount of thoughtful consideration, which results in a greater degree of random behavior that should be taken into consideration.

Browsing or navigation data is usually only semi-structured or completely unstructured (e.g., log files, etc.). In contrast, purchase data is generally highly structured and stored within relational databases ready for analysis. These database fields containing purchase data have explicit semantics, relieving analysts of the need to make assumptions regarding user behavior. In contrast, browsing or navigation data may require further modeling prior to analysis. One such potential model is the purchase lifecycle, described in further detail below in reference to FIG. 2. The purchase lifecycle is presented as a useful model for a typical e-commerce or network-based marketplace application. Other networked systems may require another user behavior model in order to obtain improved recommendation results.

Further details regarding the various example embodiments described above will now be discussed with reference to the figures accompanying the present specification.

Complements and Substitutes

The concept of substitutes and complements is borrowed from the realm of microeconomics. The following definitions are derived from the use of these terms in economics:

Substitutes and complements impact quantity demanded. In economics, one kind of good (or service) is said to be a substitute good for another kind if the two kinds of goods can be consumed or used in place of one another, in at least some of their possible uses. For example, for dinner, one can substitute beef for chicken and still have a protein component in the meal. Therefore, chicken and beef can be characterized as having a substitutionary relationship, at least in this context.

A complementary good in economics is a good which is consumed with another good. The complementary goods are said to have a negative cross elasticity of demand. This means that, if goods A and B were complements, more of good A being purchased would result in more of good B being purchased. For example, as the demand for hotdogs raises so to does the demand for hotdog buns. Therefore, hotdogs and hotdog buns can be characterized as having a complementary relationship.

FIG. 1 is a block diagram illustrating some example substitutionary versus complementary type relationships. The block diagram 100 depicts example relationships for object 102 with objects 104-114. The block diagram 100 also includes relationship strength indicator lines 120-130 and relationship type indicators 116, 118. The block diagram 100 provides a means to visualize the types of relationships that can be used within the systems and methods for making contextual recommendations discussed in FIGS. 2-10.

In an example embodiment objects 102-114 can be categories of item listings within a network-based commerce system. In this example, the object 102 represents a selected (or centered) category, such as digital single-reflex (DSLR) cameras. Objects 104 and 114 are depicted as having a substitutionary relationship to the object 102, which means, in the category example context. items in these two categories may have a history of being purchased instead of the selected category of DSLRs 102. For example, object 114 may represent a category of point-and-shoot digital cameras and object 104 may represent a category of standard (non-digital) single-reflex (SLR) cameras. As noted above, a substitutionary relationship is an indication that a user is likely to purchase one or the other of these products, or that the categories include items or information that are capable of serving a similar purpose. A more detailed description of particular methods of determining whether two related objects have a substitutionary relationship are described below in reference to FIGS. 6-10. Both digital point-and-shoot cameras 114 and standard SLRs 104 can substitute for a DSLR 102, in that each of these categories contains items that are capable of producing photographs.

Each related object is connected by a relationship strength indicator, as noted by the width of the relationship strength indicator 130, category 114 and category 102 have a strong relationship. According to this example, standard SLRs and DSLRs are connected by a very thin relationship strength indicator 120, indicating a weak relationship. A weak relationship between substitutes may indicate that historically users do not often browse both DSLRs and standard SLRs. In some embodiments, the relationship strength can be calculated based on the amount of navigation between categories. In other embodiments, the relationship strength can be calculated based on purchase or transaction history related to the two categories 102, 114. In yet other embodiments, a combination of navigation and purchase history can be used to calculate a relationship strength.

The block diagram 100 also depicts four complementary categories to DSLRs 102. In this example, these related categories can include memory cards 106, camera bags 108, laptop computers 110, and external camera flashes 112. Each of these complementary categories contain items which may have a history of being purchased in conjunction with a DSLR 102. As noted above, a complementary relationship is an indication that a user is likely to purchase or select an item from categories 106-112 after or in coordination with a purchase or selection from category 102. Typically, complementary categories contain items or pieces of information that work together, but do not serve the same purpose. As with the substitutionary categories, the complementary categories are connected by relationship strength indicators 122-128. In this example, the width of relationship strength indictor 122 indicates that DSLRs are strongly related to memory cards 106, which may indicate that memory cards are commonly purchased after or in conjunction with a DSLR. Alternatively, the relationship strength indicator 126 indicates a very weak relationship between laptop computers 110 and DSLRs 102, which may indicate that laptop computers are not commonly purchased after or in conjunction with DSLRs. However, depending upon how the relationship strengths are calculated, the weak relationship between laptop computers and DSLRs may only indicate a lack of historical transactions involving both products or limited navigation between the two categories. In another embodiment, the relationship strength may be calculated through evaluating demographic information including DSLR and laptop computer ownership. In this embodiment, the demographic information may indicate a strong relationship between these categories.

Note, the above discussion of example embodiments depicted by FIG. 1 focused on categories of items, such as could be purchased within an on-line marketplace. However, other examples can include categories of information or individual product listings. The block diagram 100 can depict any sort of related objects that can be modeled as having a substitutionary and complementary type relationship.

Purchase Lifecycle

Figure 2:
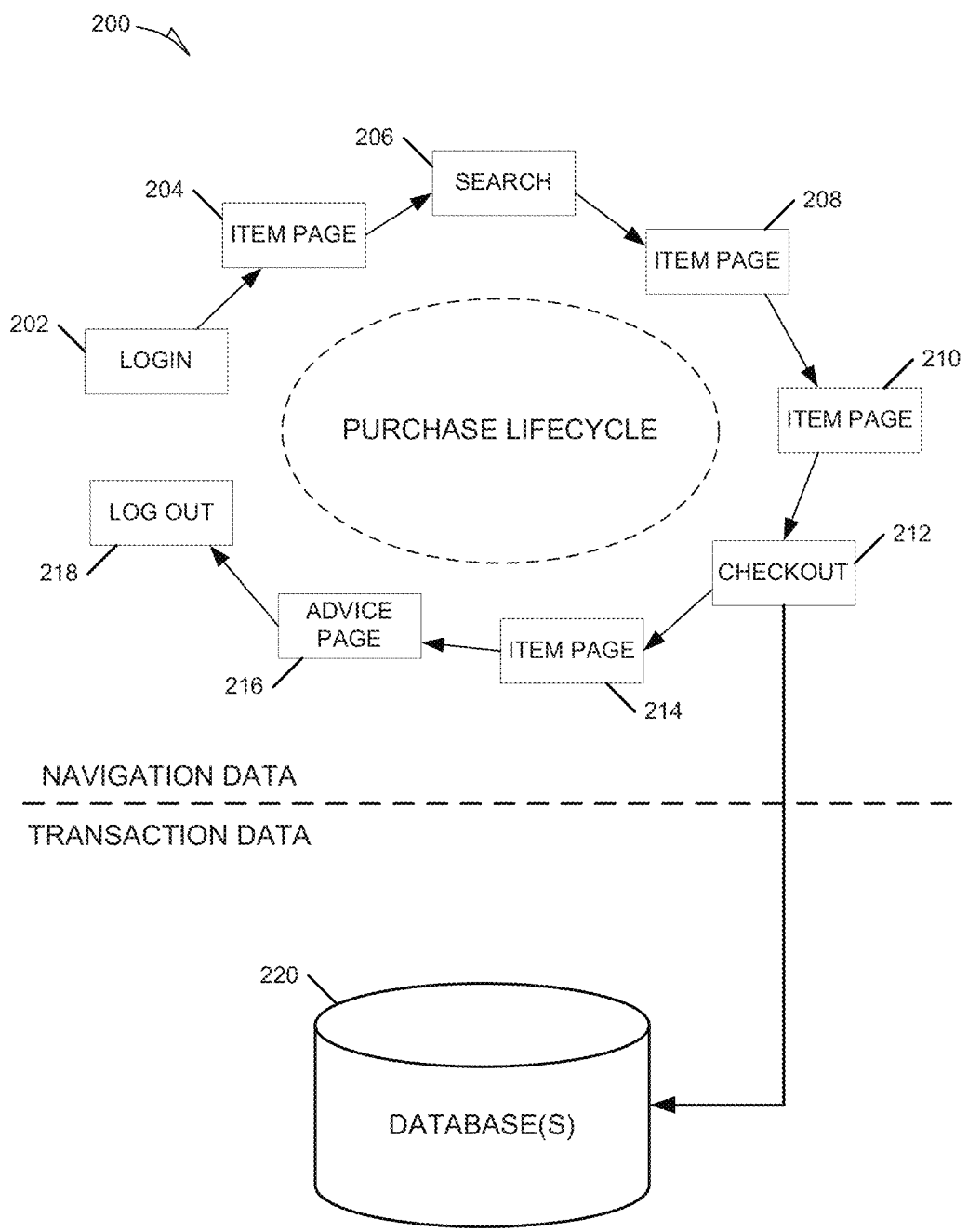
FIG. 2 is a block diagram illustrating an example purchase lifecycle in which the systems and methods for making contextual recommendation can operate.

FIG. 2 is a block diagram illustrating an example purchase lifecycle in which the systems and methods for making contextual recommendation can operate. A purchase lifecycle can be defined as a sequence of navigation operations leading up to and following a purchase on a network-based transaction system. A similar lifecycle could be modeled and applied to other types of on-line user behavior, such as making a restaurant reservation. The "purchase" lifecycle depicted in FIG. 2 is intended as a single example of many potential user behavioral models.

The purchase lifecycle 200 includes a login 202, numerous navigation operations (or pages) 204-210 and 214-218, a purchase operation, checkout 212, and a log out 218 operation. The login 202 and log out 218 operations are intended to illustrate the start and end of a user session on a network-based system. Tracking a user session assists in data collection and aggregation on the network-based system. Navigation pages 204 to 210 can represent all the pages viewed by the user prior to a purchase at checkout 212. In an example purchase lifecycle, the checkout 212 can be used to divide the lifecycle into pre-purchase and post-purchase navigation. In certain examples, the user checkout 212 operation will be logged in a transactional database 220.

Navigation pages can be further defined, in this example, as item pages, such as pages 204, 208, 210, 214, or non-item pages, such as search 206 or advice 216. Users in the pre-purchase portion of the lifecycle are likely to compare similar items before making a purchase decision. Thus, the pre-purchase portion of the lifecycle is considered the comparison stage, where a user is likely to be more interested in substitutionary type products. Once the user makes a purchase, checkout 212, the user's interests are likely to turn to complementary products.

Some additional example scenarios may assist in further defining the use of complements and substitutes. For example, if a user is repeatedly viewing within categories that have a substitutive relationship, then substitute type recommendations may be ranked higher in a list of candidate recommendations. Alternatively, if a user suddenly shifts focus away from similar items or categories to ones with a complementary relationship, it may indicate that the user has made a purchase decision and complementary items should be presented. In a networked system that provides auction listings, a user failing to win an item in a particular auction creates an opportunity for recommending a substitutionary item.

By tracking pre-purchase and post-purchase activity, combined with item versus non-item navigation pages, a network-based system can pinpoint a user's purchase lifecycle location and provide more intuitive recommendations based on that information.

Considering the fact that different types of networked systems can host a wide variety of business models and navigation flows, it may be advantageous to model the purchase (or analogous) lifecycle for each individual system. The different systems may also suggest dividing the lifecycle into more than simply pre-purchase and post-purchase as described here.

Platform Architecture

Figure 3:
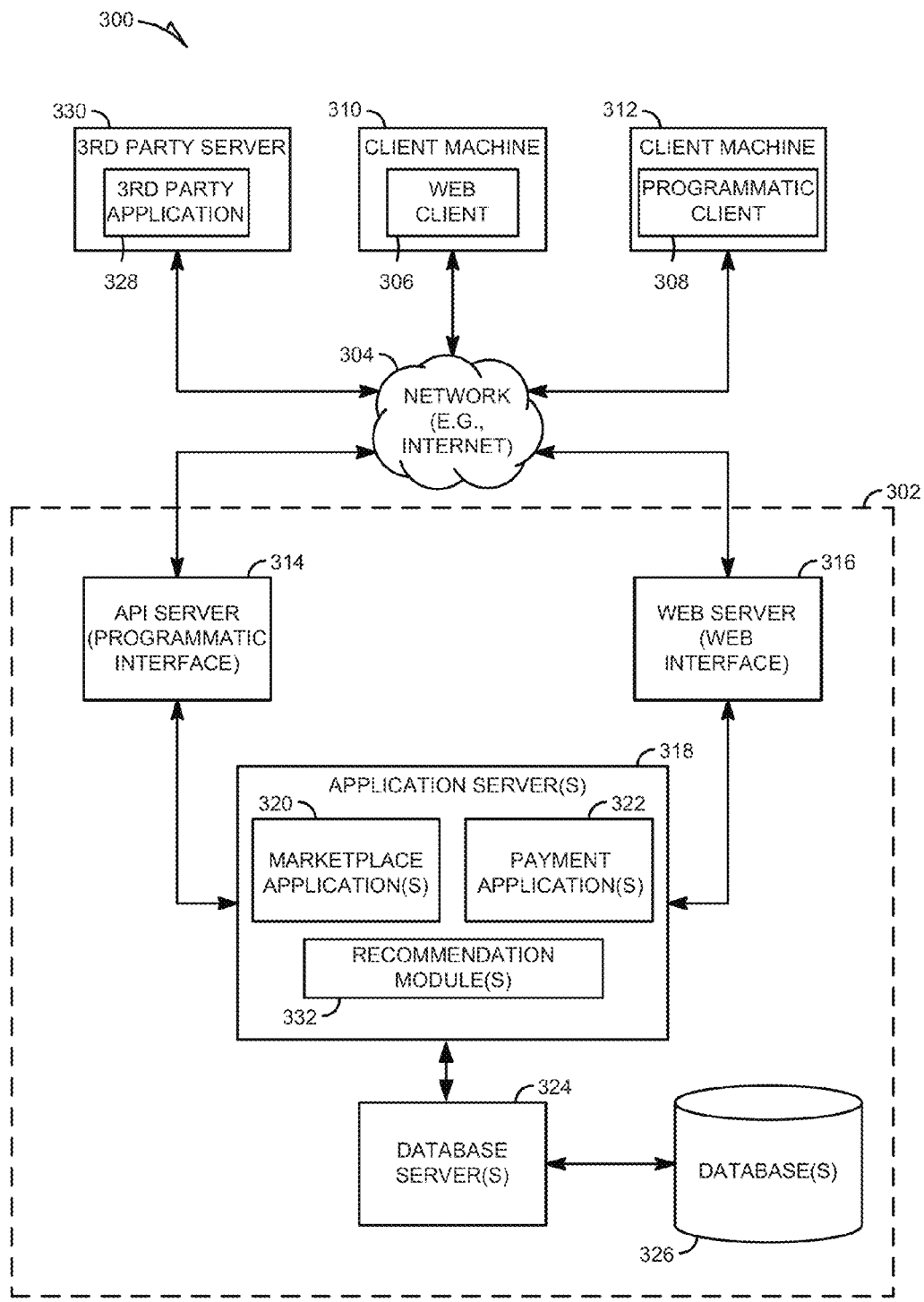
FIG. 3 is a block diagram illustrating an example architecture for a network-based system within which systems and methods for making contextual recommendations can be implemented.

FIG. 3 is a block diagram illustrating an example architecture for a network-based system within which systems and methods for making contextual recommendations can be implemented. The block diagram depicting a client-server system 300, within which an example embodiment can be deployed is described. A networked system 302, in the example forms of a network-based marketplace, on-line retail site, or publication system, provides server-side functionality, via a network 304 (e.g., the Internet or Wide Area Network (WAN)) to one or more clients 310, 312. FIG. 3 illustrates, for example, a web client 306 (e.g., a browser, such as the Internet Explorer browser developed by Microsoft Corporation of Redmond, Wash. State), and a programmatic client 308 executing on respective client machines 310 and 312.

An Application Program Interface (API) server 314 and a web server 316 are coupled to, and provide programmatic and web interfaces respectively to, one or more application servers 318. The application servers 318 host one or more marketplace applications 320, payment applications 322, and recommendation modules 332. The application servers 318 are, in turn, shown to be coupled to one or more databases servers 324 that facilitate access to one or more databases 326. In some examples, the application server 318 can access the databases 326 directly without the need for a database server 324.

The marketplace applications 320 may provide a number of marketplace functions and services to users that access the networked system 302. The payment applications 322 may likewise provide a number of payment services and functions to users. The payment applications 322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 320. The payment application 322 may also be configured to present recommendations, generated by the recommendation modules, to a user during checkout. The recommendation modules 332 may provide contextual recommendation to users of the networked system 302. The recommendation modules 332 can be configured to use all of the various communication mechanisms provided by the networked system 302 to present recommendations to users. While the marketplace applications 320, payment applications 322, and recommendation modules 332 are shown in FIG. 3 to all form part of the networked system 302, it will be appreciated that, in alternative embodiments, the payment applications 322 may form part of a payment service that is separate and distinct from the networked system 302.

Further, while the system 300 shown in FIG. 3 employs a client-server architecture, the present invention is of course not limited to such an architecture, and could equally well find application in a distributed, or peer-to-peer, architecture system, for example. The various marketplace applications 320, payment applications 322, and recommendation modules 332 could also be implemented as standalone software programs, which do not necessarily have networking capabilities.

The web client 306 accesses the various marketplace applications 320, payment applications 322, and recommendation modules 332 via the web interface supported by the web server 316. Similarly, the programmatic client 308 accesses the various services and functions provided by the marketplace applications, payment applications, and recommendation modules 320, 322 and 332 via the programmatic interface provided by the API server 314. The programmatic client 308 may, for example, be a seller application (e.g., the TurboLister application developed by eBay Inc., of San Jose, Calif.) to enable sellers to author and manage listings on the networked system 302 in an off-line manner, and to perform batch-mode communications between the programmatic client 308 and the networked system 302.

FIG. 3 also illustrates a third party application 328, executing on a third party server machine 330, as having programmatic access to the networked system 302 via the programmatic interface provided by the API server 314. For example, the third party application 328 may, utilizing information retrieved from the networked system 302, support one or more features or functions on a website hosted by the third party. The third party website may, for example, provide one or more promotional, marketplace or payment functions that are supported by the relevant applications of the networked system 302. Additionally, the third party website may provide user recommendations for items available on the networked system 302 through the recommendation modules 332.

Recommendation Modules

Figure 4:
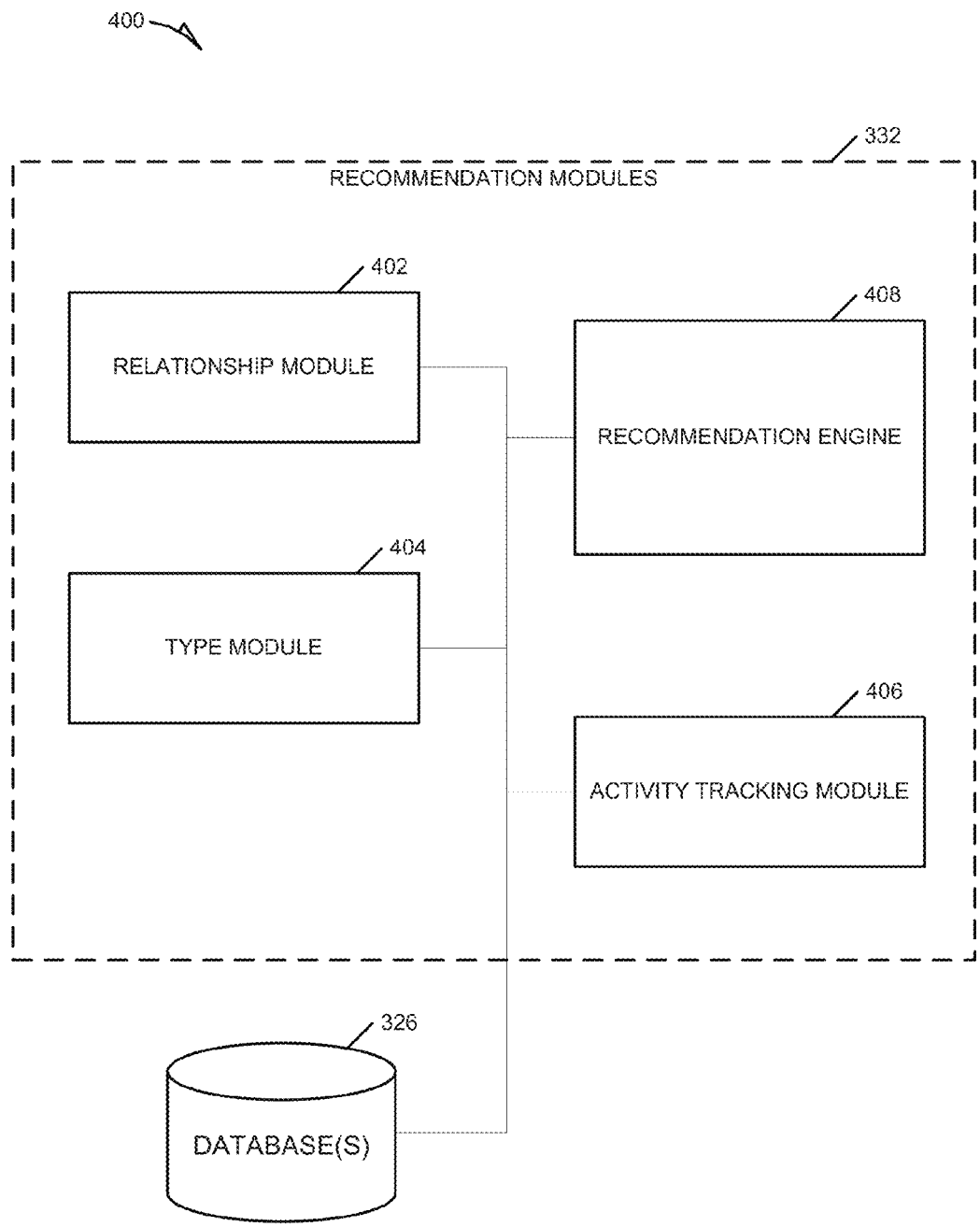
FIG. 4 is a block diagram illustrating an example system for making contextual recommendations within a network-based system.

FIG. 4 is a block diagram illustrating an example system for making contextual recommendations within a network-based system. The system 400 can include the recommendation modules 332 and the databases 326. In certain examples, the recommendation modules 332 can include a relationship module 402, a type module 404, a recommendation engine 408, and an activity tracking module 406.

The relationship module 402 can be configured to manage the relationships between related objects within the networked system 302. Related objects can include products, services, item listings, information items, and categories of items, among other things. In certain examples, the relationship module works in conjunction with the type module 404 to establish recommendation relationships that can be used by the recommendation engine 408 in providing users of the networked system 302 with recommendations. The relationship module 402 calculates a relationship score for each related object, such as related categories in a category hierarchy. The relationship score can include a transactional component and a navigational component. The transactional component represents an analysis of purchase history between the related objects. The navigational component represents an analysis of the navigation (browsing) history between the related objects.

The type module 404 can be configured to create and manage substitutionary and complementary relationships between related objects hosted on the networked system 302. In certain examples, the type module 404 can use the relationship score calculated by the relationship module 402 to assist in determining whether related objects are complementary to substitutionary. In an example, the relevance score and navigation score can be used in determining whether a given relationship should be typed as a substitute or a complement.

The activity tracking module 406 can be configured to track real-time user activity on the networked system 302. This real-time data can be passed to the recommendation engine 408 to detect potential recommendation opportunities. Certain user activity, such as viewing an item listing, can be detected as potential recommendation opportunities. For example, if a user selects a certain item listing to view, the recommendation engine 408 can determine that a substitutionary or complementary item should be recommended while the user is viewing the selected item. Determining whether to display a complementary or substitutionary item can depend upon analyzing the user's current location within the product lifecycle (e.g., pre-purchase or post-purchase).

The recommendation engine 408 can be configured to make recommendations based on a user's current activity, product lifecycle location, and the relationships between related objects. The recommendation engine 408 can access relationship data stored in the database 326 and can receive activity data from the activity tracking module 406. In some examples, the recommendation engine 408 may also communicate with the relationship module 402 and the type module 404.

Additional details regarding the functionality provided by the recommendation modules 332 is detailed in reference to FIGS. 6-11.

Recommendation Relationship Data Structure

Figure 5:
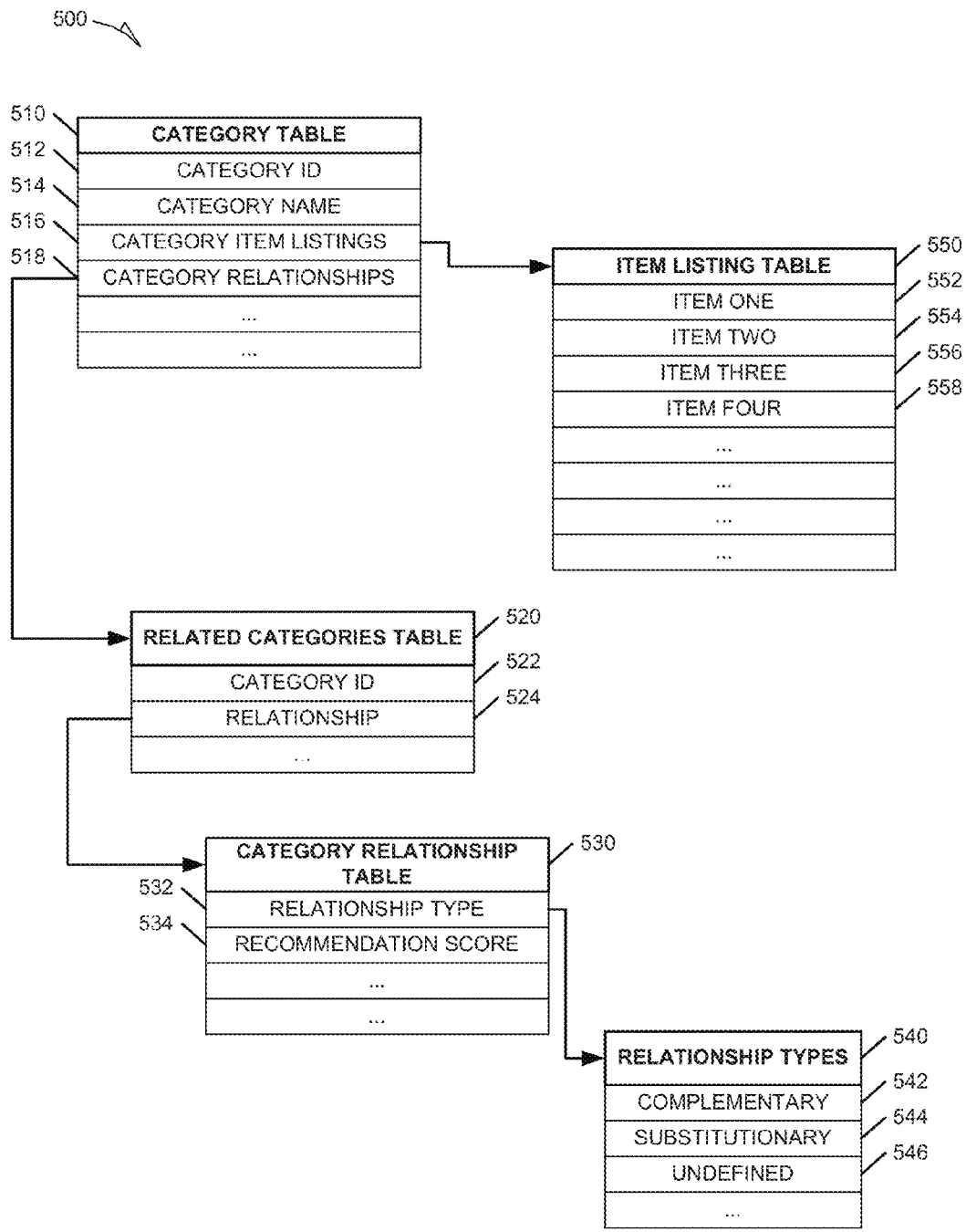
FIG. 5 is a block diagram illustrating an example data structure for making contextual recommendations within a network-based system.

FIG. 5 is a block diagram illustrating an example data structure for making contextual recommendations within a network-based system. The data structure 500 can include a category table 510, a related categories table 520, a category relationship table 530, a relationship types table 540, and an item listing table 550. The data structure 500 depicts an exemplary embodiment of a recommendation relationship data structure that may be used for example by a category-based marketplace for supporting the generation of contextual recommendations.

The category table 510 can include a category ID 512, a category name 514, a category item listings link 516, and a category relationships link 518. The category relationship link 518 can link to the related categories table 520, which can contain entries for all the categories that are in some manner related to the current category. The related categories table 520 can include entries with links 524 to the category relationship table 530 that defines the characteristics of each related categories relationship to the current category. The category relationship table 530 can include a relationship type 522 and a recommendation (or relationship) score 534, among other things. The possible relationship types 532 can be defined in a relationship types table 540. In this example, the relationship types table 540 includes a complementary type 542, a substitutionary type 544, and an undefined type 546.

Contextual Recommendation Methods

Figure 6:
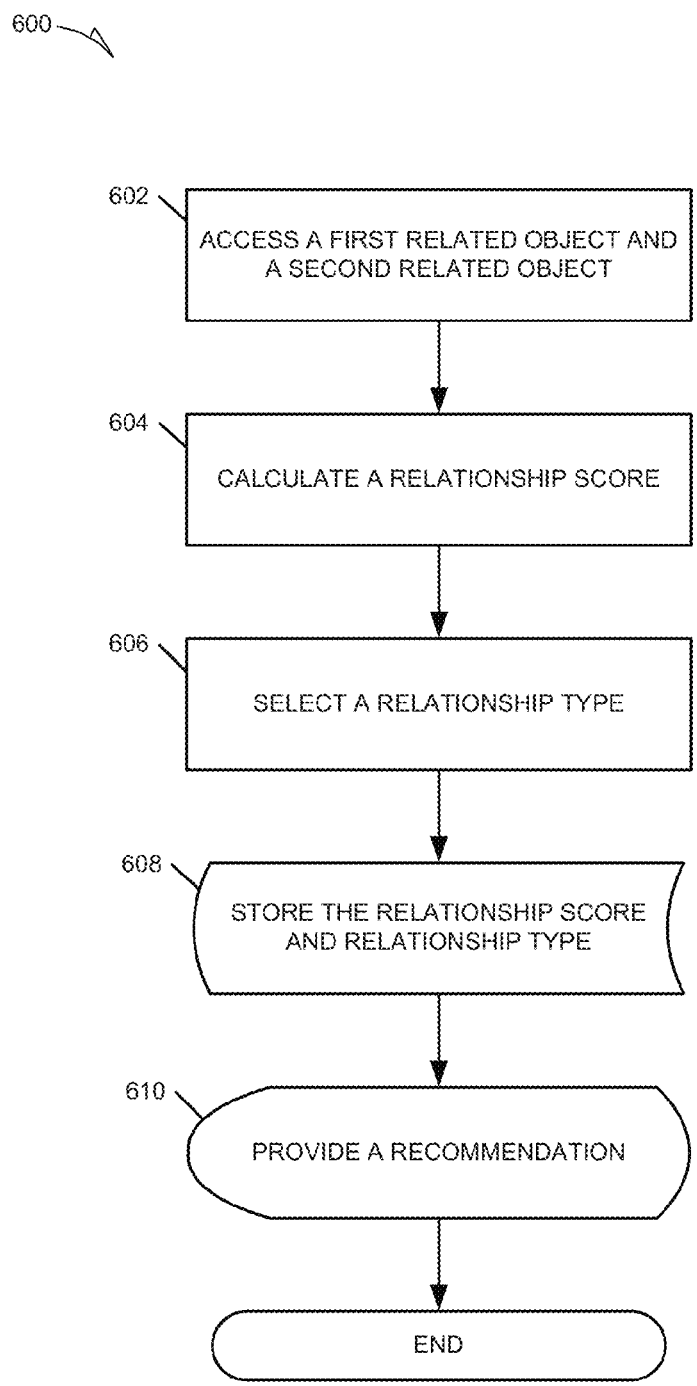
FIG. 6 is a flow chart illustrating an example method for providing contextual recommendations.

FIG. 6 is a flow chart illustrating an example method for providing contextual recommendations. The method 600 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the recommendation modules 332 illustrated in FIG. 4. The method 600 may be performed by the various modules discussed above with reference to FIGS. 3 and 4. Each of these modules may comprise processing logic.

As shown in FIG. 6, the method 600 can include operations for accessing a first related object and a second related object 602, calculating a relationship score 604, selecting a relationship type 606, storing the selected relationship type 608, and providing a recommendation 610. Method 600 can commence at operation 602 with the recommendation modules 332 accessing first and second related objects. The related objects can represent products, services, item listings, information listings, or categories of the same. The following exemplary embodiment will focus on categories of item listings within the networked system 302. In this example, the accessed categories may or may not have been previously related within the networked system 302. The method 600 can represent the initial attempt at defining a relationship between the objects selected in operation 602.

Once two objects, such as two categories in this example, are accessed, the method 600 continues at operation 604 with the relationship module 402 calculating a relationship score. In some examples, calculating a relationship can include determining the strength of the relationship between the first and the second related objects. As discussed above, the relationship strength can include two components, the transactional relationship and the navigational relationship. In certain examples, the relationship strength can also include commonality in title, description, keywords, or other attributes. Additional details regarding an example method of calculating the relationship score at operation 604 are detailed below in reference to FIG. 7A.

The method 600 continues at operation 606 with the type module 404 selecting a relationship type to further characterize the relationship between the first and second related objects. As described above, the relationship types can include a complement type and a substitute type. For example, the first related object can represent a category of push-type lawn mowers. In this example, a complementary type relationship can include a category of lawn trimmers or a category of lawn sprinklers. The complementary categories of items all include items that are useful in caring for a lawn, but each serve a different purpose. A substitutionary category can include a category of riding lawn mowers. The substitutionary category of items includes items that serve the same purpose (i.e., cutting the grass). In the exemplary embodiment, the type module 404 uses data generated by the relationship module 402 to select the proper relationship type. Additional details regarding an example method of selecting the relationship type 606 are detailed below in reference to FIG. 8.

The method 600 continues to operation 608 where the relationship score and the relationship type are stored by the relationship module 402 and the type module 404 respectively. In an example, the relationship score and the relationship type are stored in the database 326. In reference to FIG. 5, the relationship score 532 and the relationship type 534 may be stored at operation 608 within the category relationship table 530. In certain examples, the relationship score and relationship type are stored in memory within the networked system 302 for use by the recommendation engine 408 in making recommendations.

In this example, the method 600 concludes at operation 610 with the recommendation engine 408 providing a recommendation using the stored relationship score and relationship type information. Additional details regarding the generation of recommendations are provided below in reference to FIGS. 9 and 10.

Figure 7A:
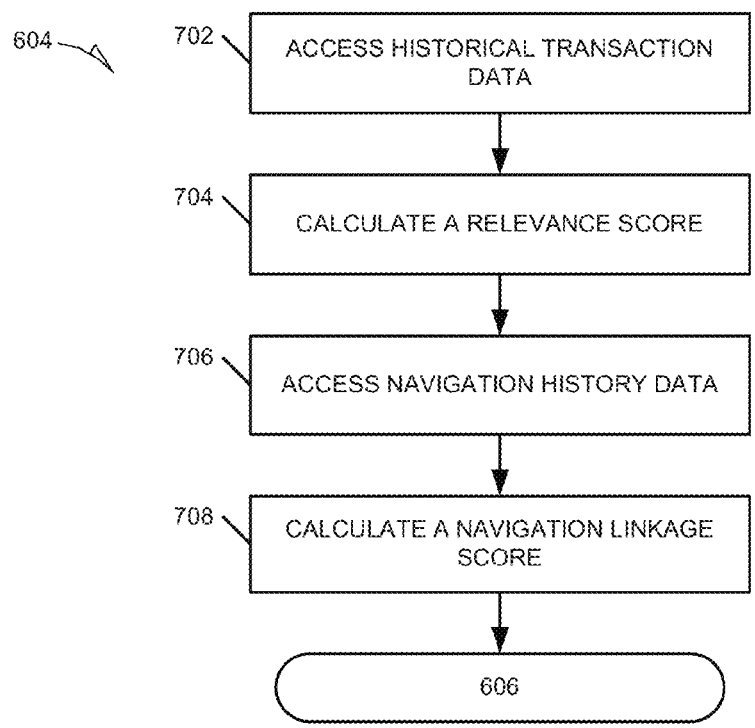
FIG. 7A is a flow chart illustrating an example method for calculating a relationship score between related objects to facilitate making contextual recommendations within a network-based system.

FIG. 7A is a flow chart illustrating an example method 604 for calculating a relationship score between related objects to facilitate making contextual recommendations within a network-based system. The method 604 for calculating a relationship score can include accessing historical transaction data 702, calculating a relevance score 704, accessing navigation history data 706, and calculating a navigation linkage score 708. The method 604 begins at operation 702 with the relationship module 402 accessing historical transaction data. In this example, the relationship module 402 can access the historical transaction data associated with the first and second related objects from the database 326.

The method 604 continues at operation 704 with the relationship module 402 calculating a relevance score from the historical transaction data. In another example, the relationship module 402 can also use additional attributes relating the first and second related objects in the calculation of the relevance score. In this example, the relevance score is calculated for a category-based recommendation system, but the following algorithms are also applicable to items or other relatable objects.

In an example relevance score calculation, $REL_{sim}(I,j)$ is computed as follows: For a collection of users, U, of the networked system 302, the database 326 can maintain transactional purchase records, trans( ), which map a user, $\mu \Gamma U$, into the categories where the user, u, has purchased items. Given two categories i and j, the simple relation $REL_{sim}$ between them can be presented as:

$$REL_{stm}(i, j) = \frac{|U_i \cap U_j|}{|U_i \cup U_j|}$$

Where $U_\epsilon$ is the abbreviation of $\{u \in U |_{i \in trans(u)}\}$, which denotes the collection of users who purchased at least one item in category i. Similarly, $U_j$ denotes the collection of users who purchases at least one item in category j. $REL_{stm}(i,j)$ indicates that the more users that purchase items in both category i and j, the more closely those two categories are related.

In another example relevance score algorithm, $REL_{cos(i,j)}$ is calculated as follows: $REL_{cos}$ computes the cosine similarity of two categories in a user-distribution space.

$$REL_{cos}(i, j) = \frac{\overrightarrow{category_i} \cdot \overrightarrow{category_j}}{\|\overrightarrow{category_i}\| \cdot \|\overrightarrow{category_j}\|}$$

All users having purchased items in category i, j are arranged in identical order (e.g., by User ID). Each element in vector $\overrightarrow{category}$ presents the number of items purchased by each user. $REL_{cos}$ measures the correlated distribution of users between two categories.

In yet another example relevance score algorithm, $REL_{cor}$ is calculated as follows: $REL_{cor}$ based on Pearson correlation coefficient:

$$REL_{cor}(i, j) = \frac{\sum_{u \in U_i \cap U_j} (N_{u,i} - \overline{N}_u)(N_{u,j} - \overline{N}_u)}{\sqrt{\sum_{v \in U_i} (N_{v,i} - \overline{N}_v)^2} \sqrt{\sum_{w \in U_j} (N_{w,j} - \overline{N}_w)^2}}$$

Where $N_{u,t}$ is the number of items purchased by user u in category i, and $\overline{N}_u$ is the average number of items purchased by user u in each category. The other components indexed by j, v, w carry a similar meaning.

In certain examples, the linear combination of the three algorithms presented above is calculated to compute a final REL(i,j). Other combinations or calculations may also be done using similar correlation models known in the art.

The method 604 continues at operation 706 with the relationship module 402 accessing navigational history data. In an example, the navigational history data is stored in a simple log file. In another example, the navigational history data is stored in the database 326. The method 604 concludes at operation 708 by calculating a navigation linkage score (also referred to as a NAV score). As noted above, identifying substitutes and complements can require more information than a simple relevance score. In this example, a method of calculating a navigation linkage score based on user navigation logs is used to provide additional information for making contextual recommendations.

Figure 7B:
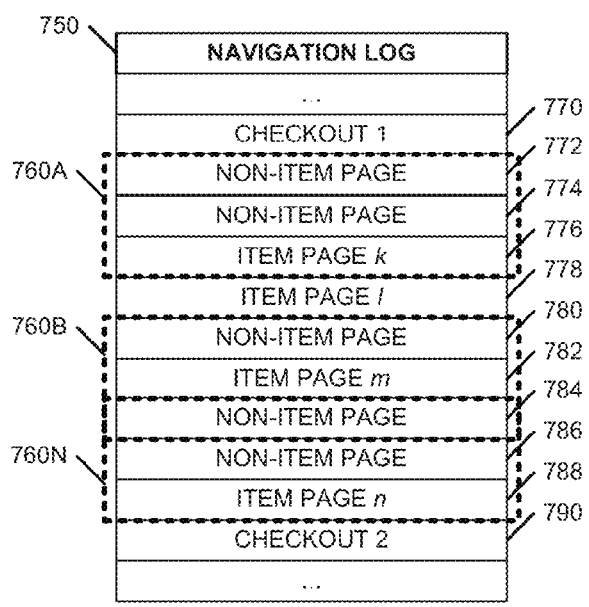
FIG. 7B is a diagram illustrating an example method for calculating a navigation linkage score between related objects.

The following is an example method for calculating a NAV score. As discussed above, in relation to FIG. 2, a purchase lifecycle model can divide navigation pages into item pages (I pages) and non-item pages (N pages). User behavior can be tracked by the networked system 302 as a sequence of I pages and N pages. FIG. 7B is a diagram illustrating an example method for calculating a navigation linkage score between related objects. FIG. 7B includes an illustration of an example navigation log 750 that contains navigation records 770-790 that have been simplified into checkout pages, non-item pages (N pages), and item pages (I pages) associated with a particular category of items. FIG. 7B also includes a processing window 760, shown in multiple locations along the navigation log 760A, 760B, . . . , 760N. The processing window 760 can be used to analyze the navigation log 750. In this example, a navigation linkage (NAV) score can be calculated as follows: First, a fixed size processing window 760 is set, in this example the window 760 is set to 3. The window 760, is then stepped through the navigation data from one checkout 770 page to the next checkout page 790. Each time the window 760 is indexed, the number of I pages associated with category i and category j that appear in the window together are counted. In this example, the NAV scores are symmetrical, thus NAV(i,j) will equal NAV(j,i).

The example navigation log 750 includes I pages from categories k, l, m, and n. In this example, indexing the window 760 through all positions between checkout 770 and checkout 790 produces the following unique window iterations (N, $I_k$, $I_l$) and ($I_l$, N, $I_m$), which contain at least two I pages (the duplicated ($I_k$, $I_l$, N) is removed in this example). In this example the following scores can be updated:

NAV(k,l)←NAV(k,l)+1
NAV(l,m)←NAV(l,m)+1

In this example, NAV(l,k) and NAV(m,l) are also updated to maintain symmetry. The size of the window 760 can affect how related objections (categories in this example) are related in terms of NAV scores. The size of window 760, in terms of number of navigation items, may need to be adjusted for different types of networked-systems 302. For example, in a well designed e-commerce system representative results may be obtained within a small window 760 size, such as 3, indicating that related objects (e.g., categories, items, etc.) are relatively closely linked in terms of navigation. However, on a more loosely defined networked system, a larger window 760 size may be advantageous to properly capture the navigation relationships between related objects.

In certain examples, a method of smoothing NAV scores can be used. In these examples, not all user navigation data provides good representation of the navigational relationships between related objects. This can be attributed to non-motivated visitors randomly visiting pages and viewing items. One mechanism for suppressing potential noise, such as random visitors, is to only analyze the portions of the navigation data containing user sessions that result in a checkout 770, 790 event and contain a certain number of navigation items (pages). In one example, only user sessions that contained 10 or more navigation items and at least one checkout 770, 790 event were included in calculating NAV scores. In certain example systems, a user may be required to login prior to making a purchase. In these systems noise can be reduced by ignoring any user sessions that do not include a login operation.

Figure 8:
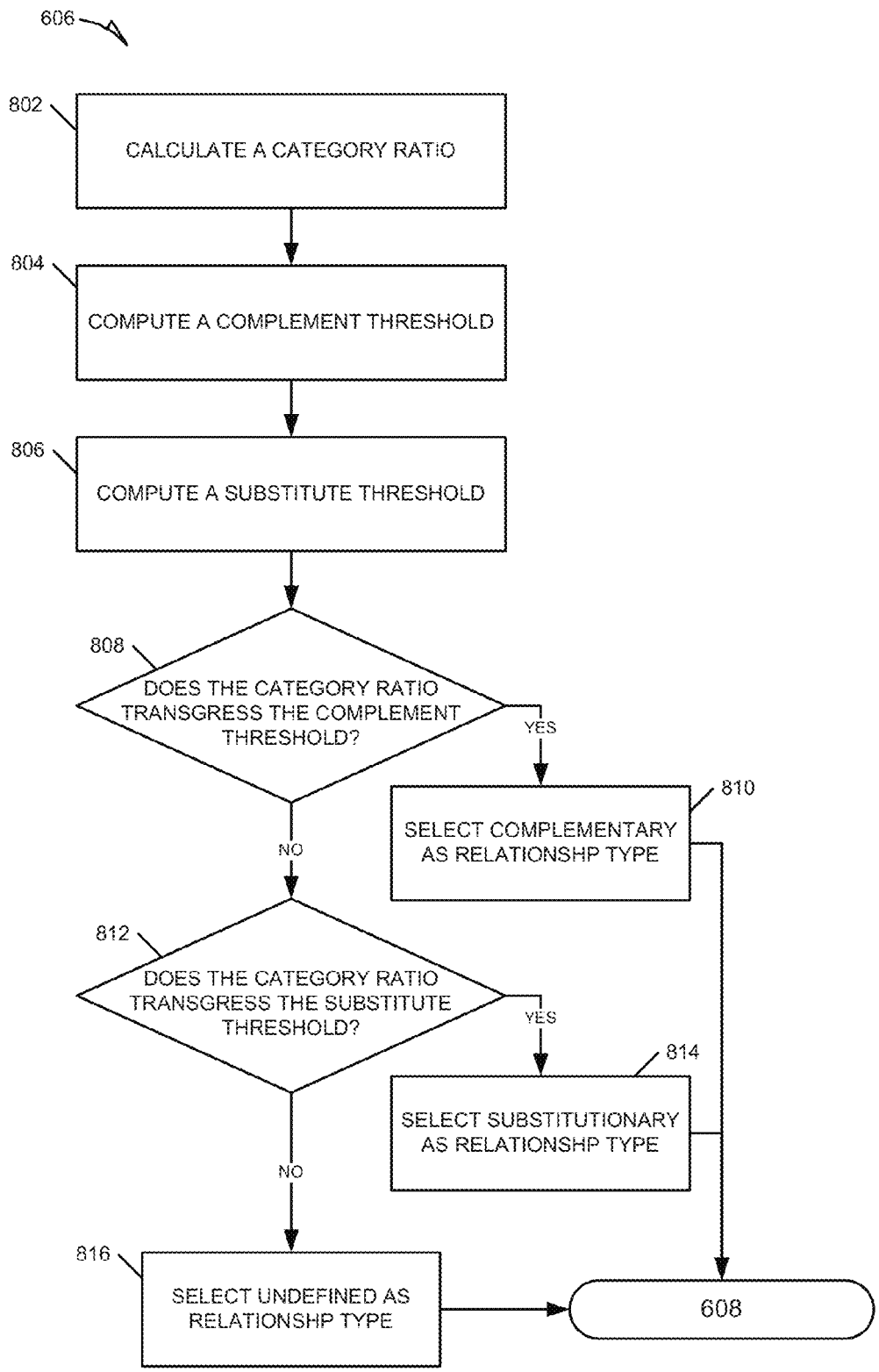
FIG. 8 is a flow chart illustrating an example method for selecting a relationship type characterizing the relationship between two related objects.

FIG. 8 is a flow chart illustrating an example method 606 for selecting a relationship type between two related objects. The method 606 represents an example embodiment for selecting a relationship type representing a relationship between two related objects. Once again, this example uses related categories as the related objects. The method 606 can include calculating a category ratio 802, computing a complement threshold 804, computing a substitute threshold 806, determining if the category ratio transgresses the complement threshold 808, and determining if the category ratio transgresses the substitute threshold 812. The method 606 begins at operation 802 with the type module 404 computing a category ratio. In this example, the category ratio is computed by dividing a REL score by a NAV score as follows:

$$RdN_{i,j} = \frac{REL(i, j)}{NAV(i \cdot j)}$$

Where $RdN_{i,j}$ represents the category ratio. In an example, if the value of $RdN_{i,j}$ is small, i and j are likely to be related by a substitute relationship. This follows from the fact that if the category ratio is small it may indicate that a large amount of navigation occurred between categories i and j, while relatively few purchases were made, as indicated by a large NAV score and a smaller REL score. A large amount of navigation between categories can indicate a substitute relationship. In contrast, if the category ratio is a large number, categories i and j are likely to be related by a complementary type relationship. This follows from the fact that if the category ratio, as defined in this example, is large it may indicate that a large number of purchases occurred relative to a small amount of navigation between the categories, as indicated by a large REL score and a relatively small NAV score. A large amount of purchases between two categories can indicate a complementary relationship.

The method 606 continues at operations 804, 806 with the type module 404 computing a complement threshold and a substitute threshold, respectively. In this example, the complement and substitute thresholds can be computed dynamically for a given category (related object). First, an average $\mu_i$ and standard deviation $\sigma_i$ of $\{RdN_{i,j}|_{j \in List(i)}\}$ are computed. Then scalar factors a and b can be set to compute the thresholds as follows:

$$rdn_{substitute}(i) = \mu_i - a \cdot \sigma_i$$

$$rdn_{complement}(i) = \mu_i + b \cdot \sigma_i$$

In this example, a=b for the calculation. It should be evident, that if the category ratio were calculated differently, the substitute threshold may represent an upper threshold, instead of a lower threshold as shown.

The method 606 continues at operation 808 with the type module 404 determining whether the category ratio transgresses the complement threshold. In this example, the category ratio, must be greater that the complement threshold for the method 606 to continue to operation 810. At operation 810, the type module 404 can set the relationship type to complementary. If the category ratio does not transgress the complement threshold, then method 606 continues at operation 812 with the type module 404 evaluating the substitute ratio. If the category ratio transgresses the substitute ratio, then the method 606 continues at operation 814 with the type module 404 setting the relationship type as substitutionary. If the category ratio does not transgress the substitute threshold at operation 812, then the method 606 continues at operation 816 with the type module 404 setting the relationship type to undefined, at least in this example. In certain examples, the complementary and substitute thresholds can be set to avoid the possibility of an undefined relationship. In other examples, additional relationship types can be defined, which may require additional logic in method 606.

Figure 9:
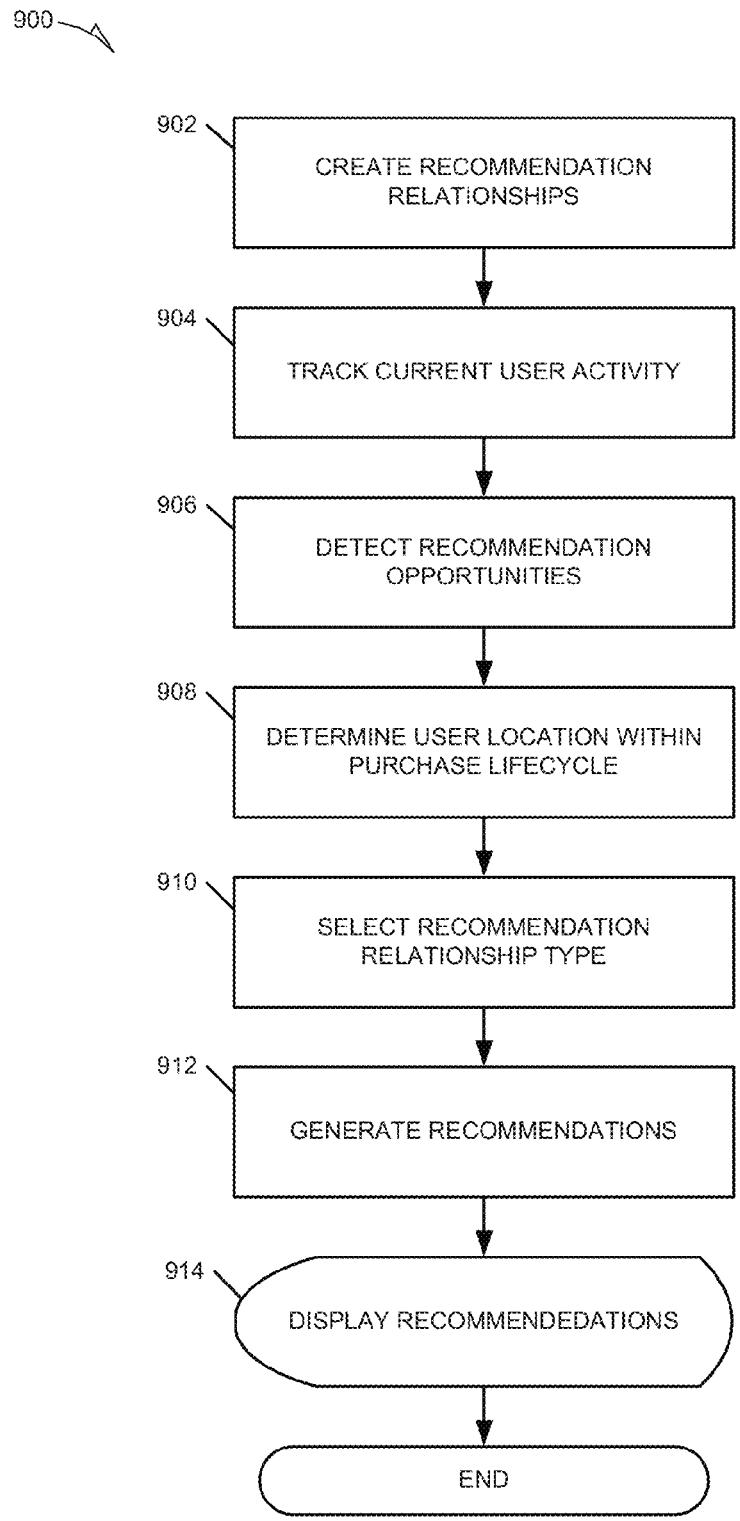
FIG. 9 is a flow chart illustrating an example method for generating purchase of lifecycle aware recommendations within a network-based system.

FIG. 9 is a flow chart illustrating an example method 900 for generating purchase lifecycle aware recommendations within a network-based system. The method 900 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the recommendation modules 332 illustrated in FIG. 3. The method 900 may be performed by the various modules discussed above with reference to FIGS. 3 through 5. Each of these modules may comprise processing logic.

The method 900 can include creating recommendation relationships 902, tracking current user activity 904, detecting recommendation opportunities 906, determining the location of a user within the purchase lifecycle 908, selecting a recommendation relationship type 910, generating recommendations 912, and displaying recommendations 914. In an example, the method 900 begins with the recommendation modules 332 creating recommendation relationships between all the related objects within the networked system 302. In certain examples, the related objects are categories of item listings within a category-based transactional networked system. The recommendation relationship can be created in a manner similar to one of those described above in reference to FIGS. 6-8.

The method 900 continues at operation 904 with the activity tracking module 406 tracking a user's current activity on the networked system 302. In some examples, the activity tracking module 406 can initiate a user session with each user actively interacting with the networked system 302 to assist in properly tracking browsing activity. A user session, in these examples, can be an HTTP session and may also be stateful (e.g., the networked system 302 may be retaining session history data in order to maintain the session). Another example, may include a stateless HTTP session for tracking user activity. In certain examples, a user session is not initiated until a user logs in to the networked system 302. In other examples, user activity can be tracked without explicit use of a user session.

At operation 906, the method 900 continues with the recommendation engine 408 detecting recommendation opportunities for current user activity data generated by the activity tracking module 406. Recommendation opportunities can include any number of detectable user interactions with the networked system 302. Some examples of recommendation opportunities can include, viewing an item, entering search terms, putting a item into a virtual shopping cart for future purchase, making a purchase, or browsing a category hierarchy. As discussed above, user activity within a networked system 302 can be modeled into a lifecycle, such as the purchase lifecycle discussed at length in reference to FIG. 2. Upon detection of a recommendation opportunity, the method 900 can continue at operation 908 with the recommendation engine 408 determining the users location within a modeled lifecycle, such as the purchase lifecycle. In the purchase lifecycle 200 example, the recommendation engine 408 may determine whether the user is pre-purchase or post-purchase. In another lifecycle model, the recommendation engine 408 can determine where within the defined sections of the lifecycle mode the user is currently.

With the lifecycle location known, the method 900 continues at operation 910 with the recommendation engine 408 selecting a recommendation relationship type. In the purchase lifecycle example, the recommendation engine 408 can select either a substitute type or a complement type depending upon whether the tracked user is considered pre-purchase or post-purchase respectively. Up to this point, the method 900 has gathered information, such as recommendation opportunity and purchase lifecycle location, that can be used by the recommendation engine 408 to generate recommendations. At operation 912, the method 900 continues with the recommendation engine 408 using the gathered information to make a recommendation to the tracked user. Additional details regarding recommendation generation is described below in reference to FIG. 10. Once the one or more recommendations are generated by the recommendation engine 408, the method 900 concludes at operation 914 with the networked system 302 presenting the recommendations.

Figure 10:
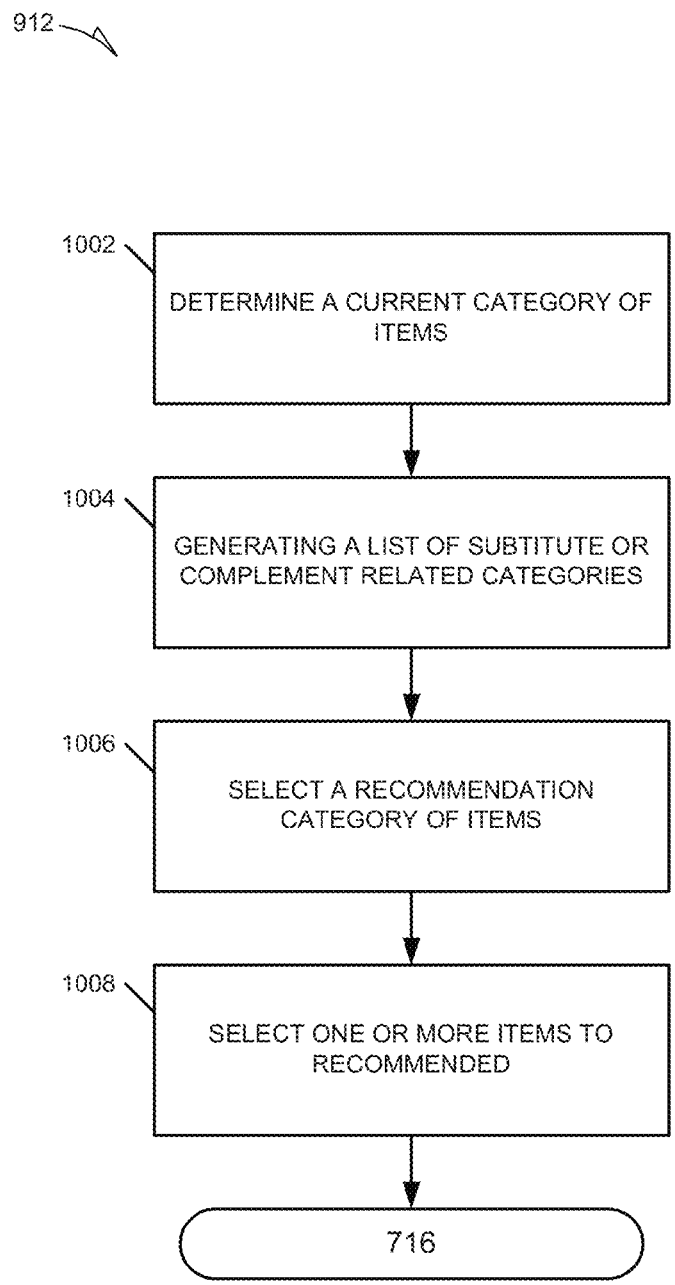
FIG. 10 is a flow chart illustrating an example method for generating recommended items within a network-based system.

FIG. 10 is a flow chart illustrating an example method 912 for generating recommended items within a network-based system. The method 912 can include determining a current category of items 1002, generating a list of substitute or complement related categories 1004, selecting a recommendation category of items 1006, and selecting one or more items to recommend 1008. The method 912 begins at operation 1002 with the recommendation engine 408 determining a current category of items associated with the recommendation opportunity. Once a current category is determined, the method 912 continues at operation 1004 with the recommendation engine 408 generating a list of either substitute or complement related categories. Which relationship type depends upon where the user is in the purchase lifecycle, determined back at operation 910 of method 900, for example. The relationship types between categories (or related objects in general) can be calculated dynamically or pre-calculated if the structure is fairly static. In the example of a category-based transaction system, pre-computation of the relationships between categories can greatly reduce real-time computational resource requirements. In this example, for each category, i, a selection of categories can be included that strongly relate to category i in terms of REL scores and NAV scores, creating an initial collection, List(i).

Then, method 912 can continue at operation 1006 with the recommendation engine 408 selecting a recommendation category, or in some examples a series of potential recommendation categories. Depending upon the user's location in the purchase lifecycle, the recommendation engine returns either complement or substitute recommendation categories. For example, in the category-based transaction system, the top M elements from $\{j|_{j \in List(i)}\}$ in ascending order of $RdN_{I,j}$ can be returned as substitute categories, while the top N elements in descending order of $RdN_{I,j}$ can be returned as complementary categories.

The method 912 concludes at operation 1008 with the recommendation engine 408 selecting one or more items from the recommendation category, or in some examples multiple categories. In the example of multiple categories, the recommendation engine 408 can select one or more of the top items from each category. The recommendation engine 408 can rank the individual items in a manner similar to the categories or any related objects (e.g., in terms of REL scores, NAV scores, or some combination). In certain examples, individual items, within a category, merely use standard CF recommendation methods as the categories can be used to provide the substitute or complement context.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
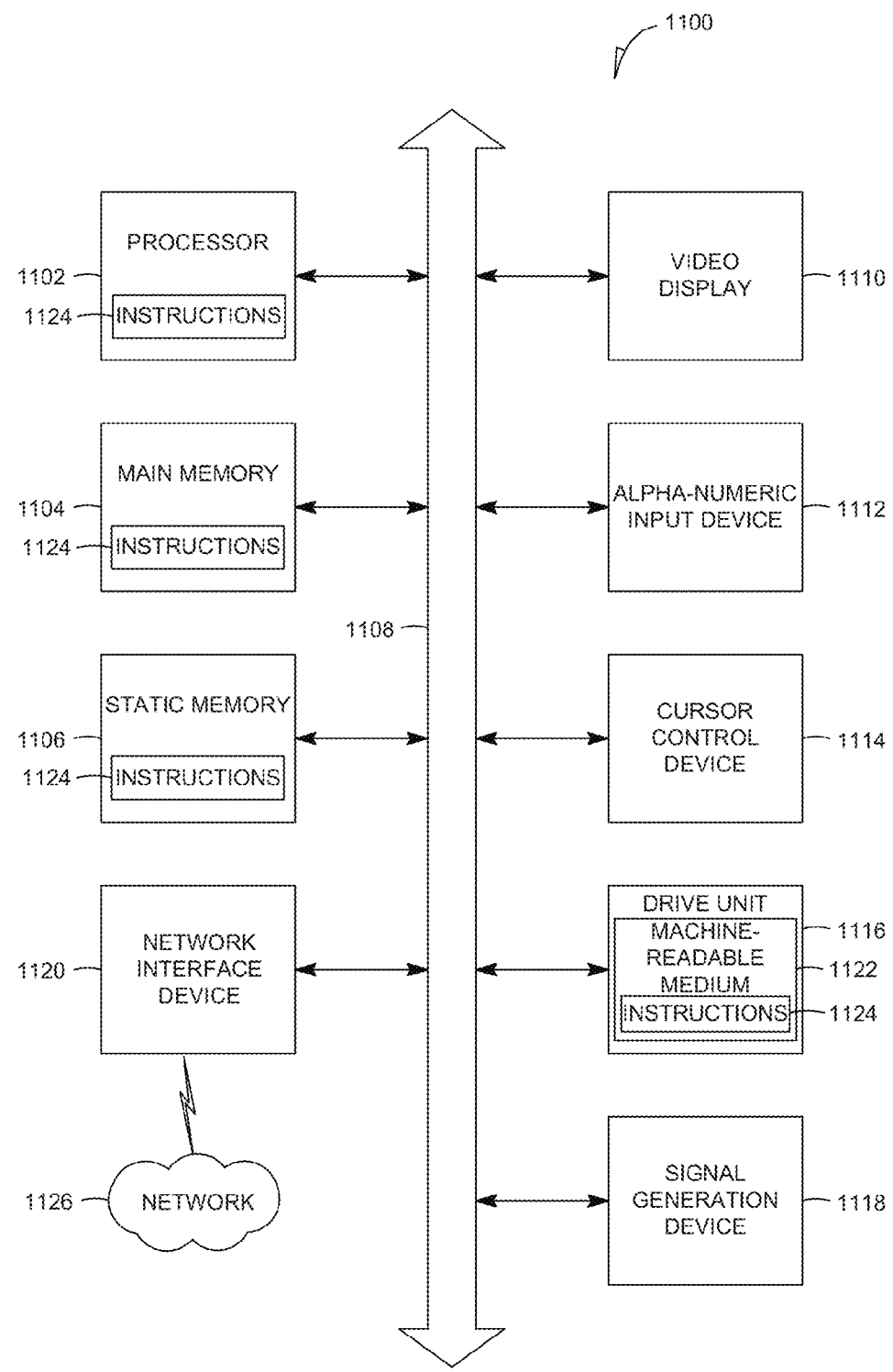
FIG. 11 is a diagrammatic representation of a machine in the example form of a computer system within which a set of instructions for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or used by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for generating a recommendation, the method comprising:

tracking, on a server including a processor, user activity associated with a user interacting with a network-based system;

detecting a recommendation opportunity based at least in part on the user activity tracked within the network-based system, the recommendation associated with a first object accessed by the user;

determining a purchase lifecycle location based at least in part on the tracked user activity;

determining a recommendation relationship type based at least in part on the determined purchase lifecycle location;

selecting a recommended object based at least in part on the recommendation relationship type and the first object; and generating the recommendation for the recommended object for presentation to the user on the network-based system.

2. The method of claim 1, wherein determining the recommendation relationship type includes selecting between a substitutionary relationship type and a complement relationship type.

3. The method of claim 2, wherein selecting the recommended object includes evaluating a plurality of relationship scores between the first object and a plurality of second objects related to the first object according to either a substitutionary relationship or a complement relationship.

4. The method of claim 3, wherein each of relationship score of the plurality of relationship scores includes a relevance score representing an historic transactional relationship between the first object and each second object of the plurality of second objects using historical transaction data associated with the first object and each second object of the plurality of second objects.

5. The method of claim 4, wherein selecting the recommended object includes determining the maximum relevance score within the plurality of relevance scores.

6. The method of claim 3, wherein each of relationship score of the plurality of relationship scores includes a navigation linkage score representing an amount of historical navigation between the first object and each second object of the plurality of second objects.

7. The method of claim 6, wherein selecting the recommended object includes determining a maximum navigation linkage score within the plurality of relevance scores.

8. The method claim 1, wherein determining the purchase lifecycle location includes evaluating a series of navigation operations performed by the user on the network-based system.

9. The method of claim 8, wherein determining the purchase lifecycle location includes determining from the series of navigation operations whether the user is pre-purchase or post-purchase.

10. The method of claim 9, wherein determining the recommendation relationship type includes selecting a complementary relationship type if the user is determined to be post-purchase, and selecting a substitutionary relationship type if the user is determined to be pre-purchase.

11. A computer-implemented recommendation system for use within a network-based system, the system comprising:

a relationship module to calculate a relationship score for a relationship between a first object and a second object within the network-based system;

a type module to select a relationship type, using the relationship score calculated by the relationship module, the relationship score representing the relationship between the first object and the second object, the selected relationship type including at least one of a complement relationship type, indicating a complementary relationship between the first and second objects, and a substitute relationship type, indicating a substitutionary relationship between the first and second objects; and a recommendation engine to provide recommendations within the network-based system using the relationship type.

12. The computer-implemented recommendation system of claim 11, wherein the relationship module is to calculate the relationship score by:

calculating a relevance score representing a transactional history relationship between the first object and the second object using historical transaction data associated with the first object and the second object;

accessing navigation history data from the network-based system; and calculating a navigation linkage score representing an amount of navigation between the first object and the second object using the navigation history data.

13. The computer-implemented recommendation system of claim 12, wherein the type module is to select the relationship type by:

calculating a category ratio using the relevance score and the navigation linkage score;

computing a complement threshold dynamically using the historical data associated with the first object and the second object;

computing a substitute threshold dynamically using the historical data associated with the first object and the second object; and selecting the complement relationship type, based on the category ratio transgressing the complement threshold; and selecting the substitute relation type based on the category ratio transgressing the substitute threshold.

14. A machine-readable storage medium embodying instructions which, when executed by a network-based system, cause the network-based system to:

access a first object and a second object calculating a relationship score for a relationship between the first and second objects;

select a relationship type, using the relationship score, representing the relationship between the first and second objects, the selected relationship type including at least one of a complement relationship type, indicating complementary relationship between the first and second objects, and a substitute relation type, indicating a substitutionary relationship between the first and second objects;

store the selected relationship type representing the relationship between the first object and the second object; and use the selected relationship type to provide a recommendation to a user accessing the network-based system.

15. A machine-readable storage medium embodying instructions which, when executed by a computer-implemented network-based system, cause the network-based system to:

track user activity associated with a user accessing the network-based system;

detect a recommendation opportunity based at least in part on the user activity tracked within the network-based system, the recommendation associated with a first object accessed by the user;

determine a purchase lifecycle location based at least in part on the tracked user activity;

determine a recommendation relationship type based at least in part on the determined purchase lifecycle location;

select a recommended object based at least in part on the recommendation relationship type and the first object; and generate the recommendation for the recommended object for presentation to the user on the network-based system.

16. The machine-readable storage medium of claim 15, wherein the instructions to determine the recommendation relationship type include instructions to selecting between a substitutionary relationship type and a complement relationship type.

17. The machine-readable storage medium of claim 16, wherein the instructions to select the recommended object include instructions to evaluate a plurality of relationship scores between the first object and a plurality of second objects related to the first object according to either a substitutionary relationship or a complement relationship.

18. The machine-readable storage medium of claim 17, wherein each of relationship score of the plurality of relationship scores includes a relevance score representing an historic transactional relationship between the first object and each second object of the plurality of second objects using historical transaction data associated with the first object and each second object of the plurality of second objects.

19. The machine-readable storage medium of claim 17, wherein each of relationship score of the plurality of relationship scores includes a navigation linkage score representing an amount of historical navigation between the first object and each second object of the plurality of second objects.

20. The machine-readable storage medium claim 15, wherein the instructions to determine the purchase lifecycle location include instructions to evaluate a series of navigation operations performed by the user on the network-based system.

21. The machine-readable storage medium of claim 20, wherein the instructions to determining the purchase lifecycle location include instructions to determine from the series of navigation operations whether the user is pre-purchase or post-purchase.

22. The machine-readable storage medium of claim 21, wherein the instructions to determine the recommendation relationship type include instructions to select a complementary relationship type if the user is determined to be post-purchase, and selecting a substitutionary relationship type if the user is determined to be pre-purchase.

* * * * *

UNITED STATES PATENT AND TRADEMARK OFFICE
CERTIFICATE OF CORRECTION

PATENT NO. : 8,756,186 B2
APPLICATION NO. : 13/776092
DATED : June 17, 2014
INVENTOR(S) : Bolivar et al.

Page 1 of 1

It is certified that error appears in the above-identified patent and that said Letters Patent is hereby corrected as shown below:

In the Claims

In column 20, line 43, in Claim 8, after "method", insert --of--, therefor

In column 22, line 41, in Claim 20, after "medium", insert --of--, therefor

Signed and Sealed this
Twenty-fifth Day of November, 2014

Michelle K. Lee
*Deputy Director of the United States Patent and Trademark Office*